Figure 5:
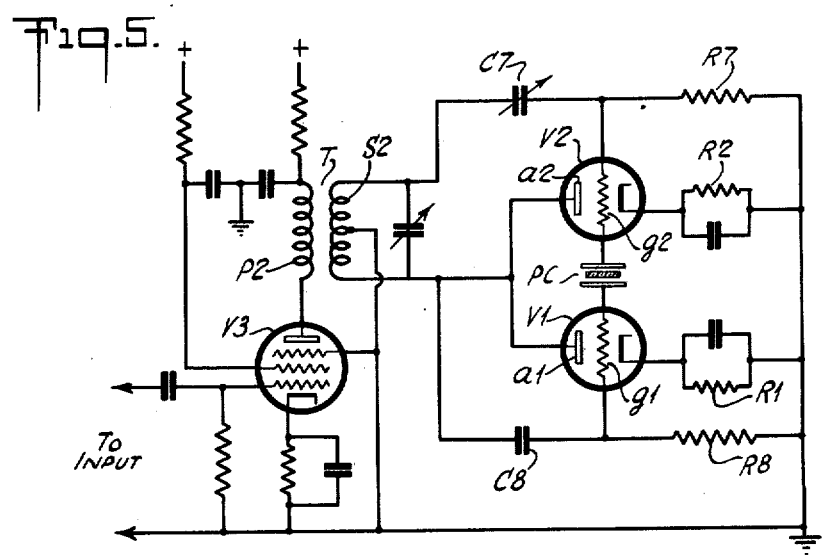

May 1, 1945. H. R. CANTELO 2,374,729
FREQUENCY DISCRIMINATOR CIRCUIT
Filed Nov. 22, 1943 4 Sheets-Sheet 1
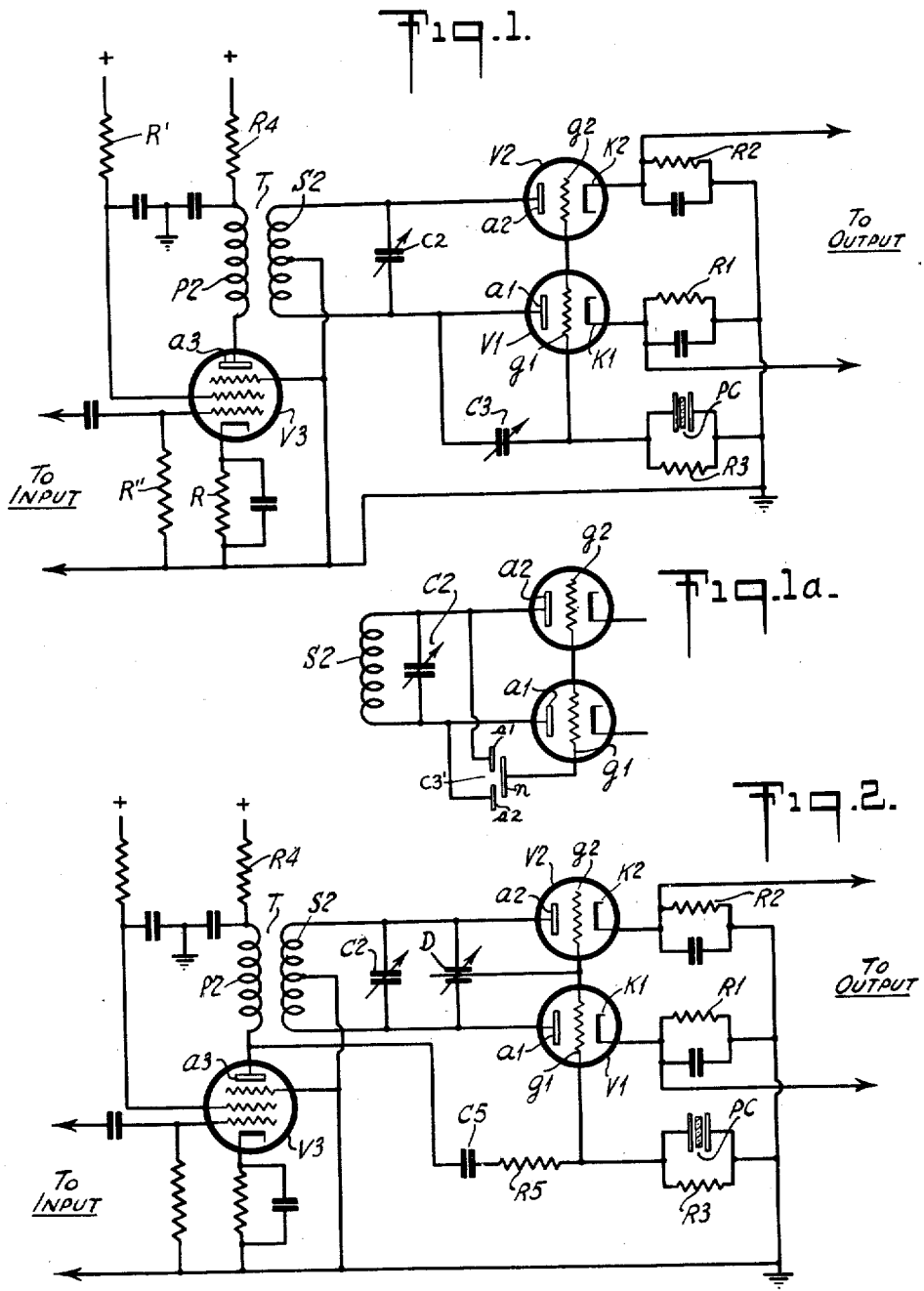
INVENTOR
HERBERT R. CANTELO.
BY H.S. Grover
ATTORNEY May 1, 1945.    H. R. CANTELO    2,374,729
FREQUENCY DISCRIMINATOR CIRCUIT
Filed Nov. 22, 1943    4 Sheets-Sheet 2
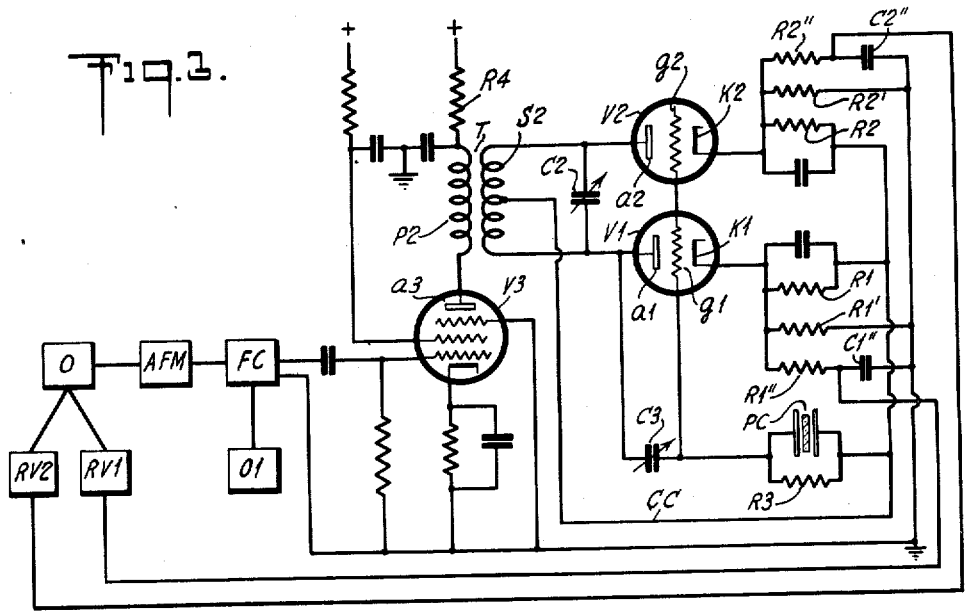
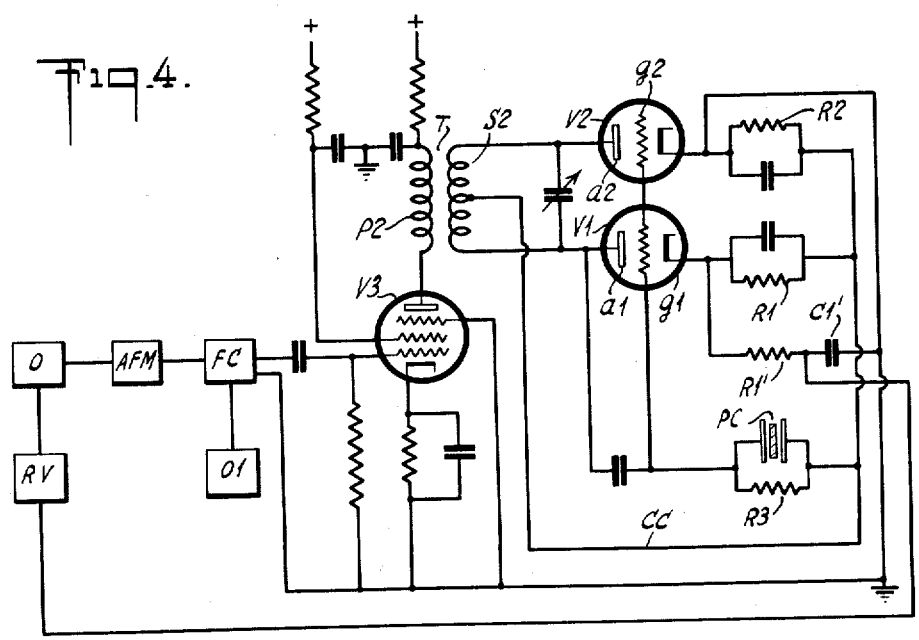
INVENTOR
HERBERT R. CANTELO.
BY H.S. Grover
ATTORNEY May 1, 1945.  H. R. CANTELO  2,374,729
FREQUENCY DISCRIMINATOR CIRCUIT
Filed Nov. 22, 1943  4 Sheets—Sheet 4

| | | |
|---|---|---|
| $f = f_x$ | $I_{A2} = I_{A1}$ | CRYSTAL RESISTIVE |
| $f > f_x$ | $I_{A2} > I_{A1}$ | CRYSTAL INDUCTIVE |
| $f < f_x$ | $I_{A2} < I_{A1}$ | CRYSTAL CAPACITATIVE |

| | |
|---|---|
| $f = f_x$ | $I_{A2} = I_{A1}$ |
| $f > f_x$ | $I_{A2} < I_{A1}$ |
| $f > f_x$ | $I_{A2} > I_{A1}$ |

| | |
|---|---|
| $f = f_x$ | $I_{A2} = I_{A1}$ |
| $f < f_x$ | $I_{A2} < I_{A1}$ |
| $f > f_x$ | $I_{A2} > I_{A1}$ |

INVENTOR
HERBERT R. CANTELO.
BY H. G. Grover
ATTORNEY

Patented May 1, 1945

2,374,729

UNITED STATES PATENT OFFICE 2,374,729

FREQUENCY DISCRIMINATOR CIRCUITS

Herbert Reginald Cantelo, Writtle, Chelmsford, England, assignor to Radio Corporation of America, a corporation of Delaware Application November 22, 1943, Serial No. 511,268
In Great Britain December 4, 1942

8 Claims. (Cl. 250—27)

The present invention relates to frequency discriminator circuits, such as may be employed to provide a frequency stabilizing voltage or such as may be employed for the detection of the modulation of wave energy the angular velocity of which is modulated.

According to the invention, a frequency discriminator circuit includes a pair of similar grid-controlled rectifiers each having at least an anode, a control-grid, a cathode, and a load resistor in the anode to cathode circuit of said rectifiers, the said resistors being of equal resistivity, a source of radio-frequency wave energy whose frequency is to be stabilized or variations in the mean frequency or phase of which are to be detected; circuit means for applying wave energy of fixed relative phase relationship from said source to the anode to cathode circuit of said rectifiers; and circuit means including a piezo-electric crystal for applying wave energy in in-phase relationship from said source across the grid to cathode space of said rectifiers, the said crystal being resonant at the desired or mean frequency of said wave energy and being so situated, that at the said desired or mean frequency a quadrature relationship exists between the phases of the energies applied respectively to the anodes and grids of said rectifiers so that equal currents are produced in said load resistors, and that at other frequencies the phase relationship between the wave energies applied respectively to said anodes and grids moves in one sense or the other, depending upon the sense of change in frequency, from phase quadrature so that unequal currents are produced in said load resistors.

The piezo-electric crystal may be series or parallel resonant at the desired or mean frequency. The said circuit means for applying wave energy from said source across the grid to cathode space may include a capacitor, the junction point of said capacitor and said piezo-electric crystal being connected to said grids, and matters may be so arranged that at the desired or mean frequency said crystal is series-resonant with the reactance of said capacitor.

According to a modification of the invention the piezo-electric crystal is replaced by an L. C. acceptor circuit. This modification renders the circuit more suitable for detection of frequency modulated waves.

Figure 7A:
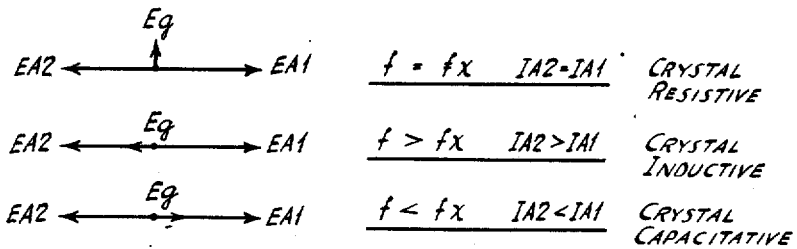
Figure 7B:
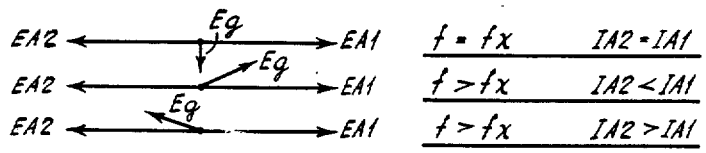
Figure 7C:
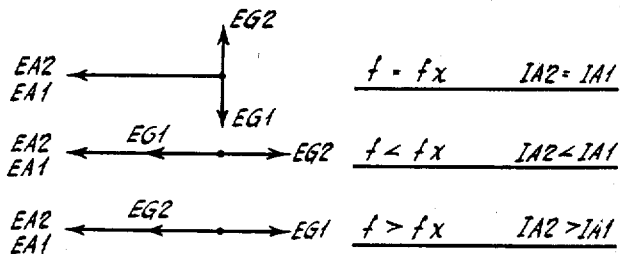
Figure 8:
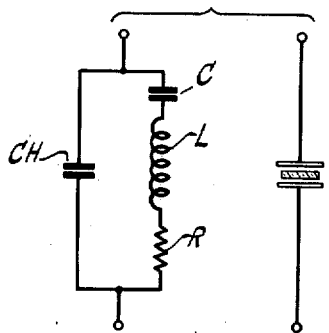
Figure 9:
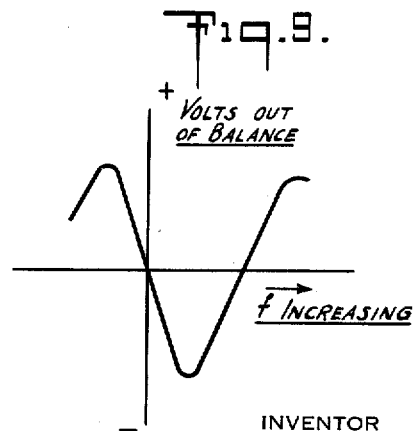

In the drawings, Fig. 1 shows an embodiment of the invention; Fig. 1a shows a modification of the input circuit to the rectifiers; Figs. 2 to 6 inclusive show respectively different modifications of the circuit of Fig. 1; Figs. 7a, 7b and 7c show respectively different vector relations existing in respective circuits of Figs. 1, 2 and 5; Fig. 8 shows the equivalent network for the piezo-electric crystal PC; Fig. 9 graphically shows the discrimination characteristic of the present invention.

In the circuit illustrated in Fig. 1, two triode valves $V1$ and $V2$ have their grids $g1$ and $g2$ connected together and to earth through a piezo-electric crystal PC which is series-resonant at the frequency to which it is desired to hold an oscillation generator constant or at the mean frequency of an angular-velocity modulated wave.

A resistor $R3$ is connected across the piezo-electric crystal. The cathodes of the two triodes $V1$ and $V2$, which are preferably of the indirectly heated kind, are connected to earth through condenser-shunted resistors $R1$ and $R2$, one to each triode. The two anodes $a1$ and $a2$ of the triodes are connected one to one end and the other to the other end of the secondary winding $S2$ of a radio-frequency transformer T, the secondary being tuned, by means of a capacitor $C2$, to the desired or mean frequency, as the case may be, so that there may be applied to the anodes $a1$ and $a2$ oscillatory energy in anti-phase relationship. The mid-point of the secondary winding $S2$ of the transformer T is connected to earth and thus to the lower end of resistors $R1$ and $R2$. One end of the said secondary $S2$ is capacitatively coupled by capacitor $C3$ to the grids of the two triodes so that there may be applied thereto, oscillatory energy in in-phase relationship. The capacitative coupling may be provided by a physical condenser or by a difference-capacitance due to any unbalance between the anode to grid capacitances of the two triodes.

The primary winding $P2$ of transformer T is connected at its one end to the anode $a3$ of a radio-frequency amplifying or limiting valve $V3$, and at its other end to one end of a resistor $R4$, the other end of which resistor is connected to the positive terminal of a source of anode current (not shown). The junction of the primary winding $P2$ and the resistor $R4$ is connected to earth through a decoupling capacitor. The cathode of the radio-frequency amplifier valve $V3$ is connected to earth through a capacitor-shunted resistor R. If the amplifier valve $V3$ is a pentode, as shown, the third grid, that is the one nearest to the anode, is connected to earth, and the second grid is connected to the positive terminal of the source of anode current through a resistor $R'$ and to earth through a decoupling capacitor. The first, or control grid of the amplifier valve $V3$ is connected to earth through a leak resistor R", across which the oscillatory energy which is to be controlled in frequency, or whose modulation is to be detected, is applied.

The explanation of the operation of the circuit may be stated as follows, reference being made to the vectors including letter A in Figs. 7a, 7b and 7c and to Figs. 8 and 9.

The equivalent circuit, Figure 8, requires no description, and all that need be said about it is that C, L, and R represent, respectively, the capacitative, inductive, and resistive components of the impedance of the crystal PC of Fig. 1, while CH represents the capacitance of the crystal holder. This capacitance CH can be ignored for the purpose of the following description.

At the series-resonant frequency of the crystal PC, the impedance of the crystal is resistive and of comparatively low value. At frequencies higher than the resonant frequency, the crystal shows inductive reactance and at frequencies lower than the resonant frequency, it shows capacitative reactance. If the capacitance of the condenser C3, by which oscillatory energy is applied to the grids of the rectifiers V1 and V2, is of suitably small value, the phase and magnitude of the current flowing to earth through this condenser is determined mainly by the said condenser. This current will lead the anode voltage EA1, as shown in Fig. 7a, of rectifier V1 by nearly 90° and it sets up a voltage Eg between the two grids g1 and g2 and earth. Where the applied frequency f is equal to the resonant frequency fx of the crystal this voltage Eg will be in phase with the current through the condenser. Thus in Fig. 7a voltage Eg leads the anode voltage EA1 by 90°, and lags behind the equal but opposed anode voltage EA2 of the other rectifier valve by 90°. The scalar values of rectified current IA1 and IA2 through the cathode resistors R1 and R2 will therefore be equal in this condition, and no voltage difference will exist between the cathodes K1 and K2 of the rectifiers.

When the applied frequency f exceeds fx, the crystal PC exhibits inductive reactance of a magnitude which increases with frequency. So long as the capacitative reactance of the coupling capacitor C3 considerably exceeds the inductive reactance of the crystal PC, the phase of the current through this condenser to earth will still be determined mainly by the condenser, and a current leading the voltage at the anode a1 of rectifier V1 by nearly 90° continue to flow. This current will set up a voltage Eg between the grids and earth which, in the inductive reactance condition of the crystal leads the current through the coupling condenser by 90°. The voltage Eg, therefore, leads the anode voltage EA1 by 180°, and is in phase with the anode voltage EA2. The scalar values of the rectified currents IA1 and IA2 will now become unequal, IA2 being greater than IA1. These vector relations are shown in Fig. 7a. As the frequency continues to increase the grid voltage will increase and accentuate the inequality of rectified currents. An out-of-balance voltage between the cathodes K1 and K2 will now exist.

When the applied frequency f is less than fx, the crystal exhibits capacitative reactance and the phase of the current through the coupling capacitor C3 to earth will lead the anode voltage EA1 by 90°. The voltage set up between the grids g1 and g2 and earth will now be in phase with the anode voltage EA1, and 180° out of phase with the anode voltage EA2. The scalar values of the rectified currents IA2 and IA1 will again be unequal, IA1 being greater than IA2, and an out-of-balance voltage will exist, between the cathodes, of a polarity opposite to that present when the applied frequency f was greater than fx.

It can thus be seen that the effect of applying a frequency which is varied continuously from one side of the resonant frequency of the crystal to the other, is to produce, as indicated in Fig. 9, an out-of-balance voltage which changes in magnitude and polarity from a positive value through zero to a negative value at a very rapid rate. The rapidity of the change is due to the high effective "Q" of the piezo-electric crystal PC. In a practical test of such a circuit out-of-balance voltages of the order of ±10 v. were obtained for frequency changes of ±300 cycles about a crystal frequency of 2225 kilocycles.

In a modified circuit illustrated in Fig. 2, instead of using the capacitative coupling provided by capacitor C3, between one end of the secondary winding of the transformer and the grids of the two rectifiers, a blocking condenser C5 and a resistor R5 are connected in series between the anode end of the primary winding P2 (that is between the anode of the amplifier or limiter valve V3) and the grids g1 and g2 of the rectifier valves V1 and V2. In this modification the resistor R5 in the connection between the primary winding P2 of the transformer T and the grids of the rectifier valves is of such a high value that the current through it is substantially in phase with the voltage across the primary winding of the transformer T and the voltage between the grids and earth is, at the resonant frequency of the crystal, in phase with the voltage across the primary. A differential condenser D is included in the grid circuits of rectifiers V1 and V2.

If the tuned secondary circuit is in anti-resonance with the incoming frequency, the voltage across the secondary winding S2 is displaced by 90° from the voltage across the primary winding P2, and since this voltage is divided equally by the centre connection, at the resonant frequency f, the voltage EA2 (see Fig. 7b) at the anode of one rectifier V2 will lag behind while EA1 at the anode of the other rectifier V1 will lead the grid voltage Eg by 90°, and equal currents IA2 and IA1 will flow in resistors R2 and R1 respectively. If the frequency now changes to one side or other of the resonant frequency of the crystal by a small amount, the phase of the grid voltage will change towards a condition of phase opposition to the voltage at one anode and towards phase coincidence with the voltage at the other, depending upon the sense of change in frequency. Unequal currents will then flow in resistors R1 and R2.

In the application of the invention to automatic stabilization of the frequency generated by an oscillation generator, it is necessary to eliminate the standing bias voltages between the cathodes K1 and K2 of the two rectifiers V1 and V2, on the one hand, and earth on the other hand. These standing bias voltages are of the same polarity. Since the out-of-balance voltage changes differentially, it is desirable to apply the frequency stabilizing bias voltage differentially to reactance valves connected in push-pull. For this purpose, the following modifications, which are illustrated in Figure 3, are made to the first described circuit, namely:

The capacitor-shunted resistors R1 and R2, and the parallel connected crystal PC and resistor R3, instead of being connected to earth and thus to the mid-point of secondary winding S2, are connected to a common conductor CC, not earthed, and are thus returned to the mid-point of secondary winding S2. The cathodes K1 and K2 of the two valves are connected to earth through further resistors, respectively R1' and R2'. These further resistors are of like resistivity and serve to divide the out-of-balance voltages at cathodes K1 and K2 equally and in opposite senses to provide the frequency controlling potentials. The cathodes of each of the two valves are connected to earth through further resistors, respectively R1" and R2", each in series with a capacitor, respectively C1" and C2".

The effect of the two resistors R1' and R2' is to divide equally, and in opposite senses, the out of balance bias voltages appearing at the cathodes of the rectifiers so as to provide the frequency stabilizing biasses for a pair of push-pull reactance valves RV1 and RV2. The control voltages are taken from the junction of resistor R1" (or R2") and capacitors C1" (or C2"). These valves are associated with the oscillator O, which is to be stabilized, in push-pull relationship. The resistors referred to as R1" and R2" and the condensers C1" and C2" constitute filters of long time constant, which are provided to prevent the application to the reactance valves of rapidly changing voltages such as would arise if the oscillator O were frequency modulated by audio or signals applied to the reactance valves.

The output of oscillator O may be subjected to amplification, frequency multiplication, or frequency division in AFM, and to frequency change in FC in association with oscillator O1.

In a practical circuit, set up as just described, it was found, that such a variation of the tuning condenser of an oscillator as, in the absence of the control circuit, would cause a variation of some thousands of cycles/second, with the control circuit in operation caused practically no variation in frequency. Moreover, slight mistuning of the tuned secondary circuit S2 of the transformer T, caused no change of oscillator frequency.

The control circuit may, as illustrated in Fig. 4, be used for the stabilization of an oscillator which has associated with it only one reactance valve. In this case, the control circuit is organized in exactly the same manner as in Fig. 1, except that the capacitor-shunted resistors R1 and R2 and the parallel-connected crystal PC and resistor R3, instead of being connected to earth and thus to the mid-point of secondary winding S2, are connected to a common conductor CC (as in Fig. 3). The cathode of one of the rectifier valves (V2 as shown) is connected directly to earth, and the cathode of the other rectifier V1 is connected to earth through a resistor R1' and capacitor C1' in series to constitute a filter of sufficiently long time-constant. The control voltage is taken from the junction of the resistor R1' and capacitor C1' to a reactance valve associated with oscillator O.

With a piezo-electric crystal as the controlling element, the change in the bias voltage from maximum on one side of the mean frequency to maximum on the other side, occurs over a frequency range of only a few hundred cycles. For this reason the circuit is highly suitable for use as a detector of phase modulated signals, though it is not entirely suitable for use as a frequency discriminator for the detection of frequency modulated signals in which the frequency may deviate from its mean position by many thousands of cycles. By use of a tuned L. C. acceptor circuit in place of the crystal the sensitivity may be reduced, and the frequency range over which the desired characteristic is realized, may be extended so as to fit the circuit for use as a detector of frequency modulated signals. In the preceding description, the crystal (or if an L. C. circuit is employed, this circuit) has been assumed to be series-resonant.

It is also within the scope of the invention to employ the parallel mode of resonance of the crystal PC or to use a parallel tuned circuit. Since in general, in the case of the crystal, the capacity of the crystal holder CH, see Fig. 8, is of the order of at least one hundred times that of the capacity C (in the equivalent network) of the crystal, the parallel mode of resonance will occur at a frequency slightly higher than that at which series resonance takes place. The operation of the circuit under conditions of parallel resonance may for example be explained by reference to the explanation of the first described circuit shown in Fig. 1.

When the applied frequency $f$ is slightly greater than that, $fx$, at which the crystal is in series resonance the previous explanation has shown that the voltage $Eg$ at the grid of rectifier valve V1 will lead the voltage EA1 at the anode of the same valve by 180° and be in phase with the voltage EA2 at the anode of the other. If the frequency be now increased to a value approaching that of parallel resonance the impedance of the crystal network will rapidly rise to such an extent as will cause the phase of the current through the coupling condenser C3 to be determined mainly by the impedance of the crystal network and not by the value of this coupling condenser. Just below the frequency of parallel resonance of the crystal, the current through the coupling condenser C3 will lag behind the voltage EA1 by nearly 90° and the voltage $Eg$ at the grids will be in phase with the voltage EA1 since at such a frequency, the crystal behaves as an inductance of high value. Thus as the frequency increases there will occur a reversal of the phase relationship between the voltages at the grids and the anodes from a condition in which the voltage $Eg$ at the grids is in antiphase with EA1 to one in which the voltage at the grids is in phase with EA1. This reversal of phase will cause a reversal of the polarity, as indicated at the second cross-over of the curve in Fig. 9, of the out-of-balance voltage between the cathodes of the rectifiers.

If this region of the characteristic curve is used, the sense of connection of the biassing voltage for frequency stabilising purposes will have to be reversed with respect to that employed with the crystal in the series resonant condition.

At a frequency equal to that at which the crystal is in parallel resonance, the crystal network becomes highly resistive and the voltage $Eg$ at the grids will remain in phase with the voltage EA1. As the frequency continues to increase, the crystal network becomes capacitative and the voltage $Eg$ will remain in phase with voltage EA1.

If the capacitance of capacitor C3 is very much reduced in value, to such an extent that even at the frequency of parallel resonance of the crystal network, when the crystal behaves as a resistance of very high value indeed, the reactance of capacitor C3 is still very much greater than the impedance of the crystal network and the phase of the current in the branch, C3, PC will be determined by C3 and will lead voltage EA1 by nearly 90°. In such a condition, at frequencies just lower than that of parallel resonance of the crystal, the voltage $Eg$ will lead the current by 90°, and will therefore lead the voltage EA1 by 180° and be in phase with EA2. At the frequency of parallel resonance voltage $Eg$ will load voltage EA1 by 90° and lag behind EA2 by 90°. At frequencies just above parallel resonance voltage $Eg$ will lag behind the current by 90° and therefore be in phase with voltage EA1 and will lead voltage EA2 by 180°. It is also possible to employ other modes of resonance of the crystal and its associated circuit elements.

Thus, for example, at some frequency greater than that corresponding to series resonance of the crystal there is the possibility of series resonance of the condenser C3 (Fig. 1) with the inductive impedance of the crystal network. At a frequency just below this frequency the branch C3—PC will be capacitative and the current through it will lead the voltage EA1 by 90°. Since the impedance of the crystal network at this frequency is itself inductive the voltage $Eg$ will lead this current by 90°. Consequently, voltage $Eg$ will lead voltage EA1 by 180° and will be in phase with voltage EA2. At some higher frequency, at which the reactance of capacitor C3 is in resonance with the inductive impedance of the crystal, the current through the branch C3—PC will be in phase with voltage EA1 and, since the crystal is inductive, voltage $Eg$ will lead the current by 90°. Consequently, the voltage $Eg$ will lead voltage EA1 and lag behind voltage EA2 by 90°. At a still higher frequency, when the inductive impedance of the crystal exceeds the reactance of capacitor C3, the current through the branch C3—PC will lag behind voltage EA1 by 90° and $Eg$ will in consequence be in phase with voltage EA1 and 180° out of phase with voltage EA2. In this condition, the phase relationship is similar to that obtaining at frequencies approaching the parallel resonant condition of the crystal network. The second crossover is then reached at the frequency at which capacitor C3 is in series resonance with the crystal network, provided the capacitance of capacitor C3 is larger than that of crystal holder CH. In this condition the change of phase sequence will be similar to that described for the condition of parallel resonance of the crystal network when the capacitor C3 has a very small capacitative value.

Since the series and parallel modes of resonance of piezo-electric crystals, in general occur at frequencies which are very close together it may be desirable or even necessary, in some cases to suppress one of the off-resonance peaks of the out of balance voltage so as to avoid the possibility of the crystal jumping from one mode to the other if the frequency of applied energy should deviate to a sufficient degree. Such a condition might occur if the applied energy were an angular-velocity modulated wave, and the depth of modulation were sufficient to intrude upon that part of the characteristic, connecting frequency with out of balance voltage, at which the slope of the curve reverses. Such suppression can readily be effected if a differential capacitor C3' which is shown in Fig. 1a, be employed instead of capacitor C3 for coupling the secondary winding S2 of transformer T to the grids of the two valves. In such an arrangement, the fixed electrodes or stators s1 and s2 of the differential condenser would be connected to the two ends of the secondary winding (or what amounts to the same thing, to the anodes a1 and a2 of the two valves V1 and V2) and the moving electrode $n$ would be connected to the grids g1 and g2 of the two valves. The off-resonance peak of the out of balance voltage which occurs at a frequency below that of series resonance of the crystal can be readily suppressed by a suitable adjustment of the condenser. By this adjustment the voltage set up across the piezo-electric crystal may be partially neutralised without detriment to the performance of the device at the higher frequencies. Suppression of the off-resonance peak which occurs at a frequency greater than that at which the crystal is in series resonance may, by a suitable modification of the circuit, also be achieved.

Figure 6:
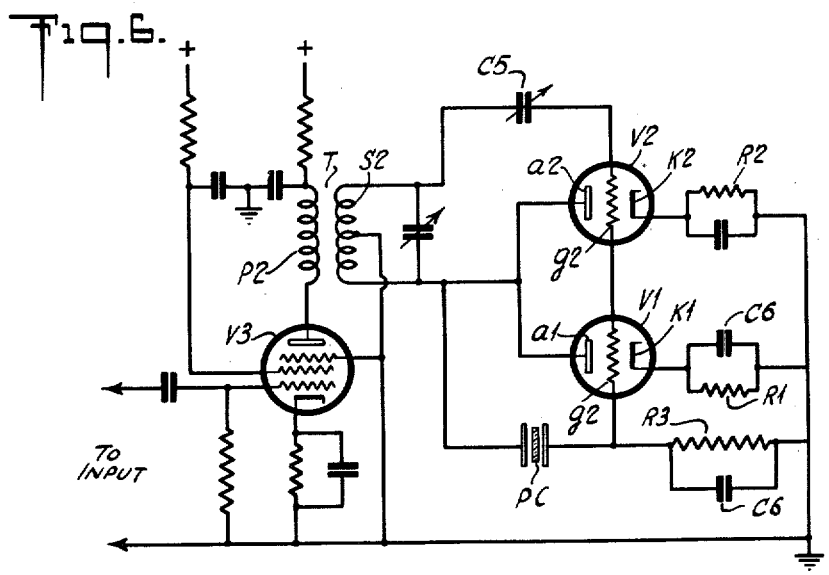

Thus the parallel resonance condition which occurs at a frequency above that of series resonance may be suppressed in the manner indicated in Fig. 6, by connecting the crystal between the anode a1 of the one rectifier V1 and the common grids g1 and g2, and a balancing capacitor C5 of the correct value to neutralise the capacitance of the crystal holder between the anode a2 of the other rectifier V2 and the common grids, a capacitor C6 of suitably high capacitance being connected (in parallel with a leak resistance R3 of suitable value) between the common grids g1 and g2 and the common or earthed return point from the cathode resistors. With this circuit the phase of the grid voltage $Eg$ tends towards coincidence with that of the anode voltage EA1 of the rectifier V1 to which the crystal is coupled at frequencies below that of series resonance of the crystal and towards phase opposition with the anode voltage EA1 of the said rectifier V1 at frequencies above that of series resonance.

Another circuit in which the parallel resonance condition which occurs at a frequency above that of series resonance may be suppressed is illustrated in Fig. 5.

In the circuit of Fig. 5, the anodes a1 and a2 of the valves V1 and V2, instead of the grids, are connected together and the two grids g1 and g2 are connected respectively through capacitors C7 and C8 to opposite ends of the tuned secondary winding S2 and through resistors R7 and R8 to a common point, for example earth. Anodes a1 and a2 are connected in common to the same end of the tuned secondary winding as is grid g1. The grids are also coupled together through the piezo-electric crystal PC. Capacitor C8 may consist of the anode to grid capacitance of valve V2, or it may be an additional physical capacitor as shown. Capacitor C7 is variable.

In this circuit, any difference of potential established between the electrodes of piezo-electric crystal PC is divided between grids g1 and g2 by resistors R1 and R2. The capacitative values of capacitors C7 and C8 are so chosen, that at frequencies adjacent to the series-resonant frequency of the crystal, the phase of the displacement current in the branch C7, PC, C8 is largely determined by the capacitances of capacitors C7 and C8. In Fig. 7c are shown vectors of the phase relationships between the grid voltages EG1 and EG2 and anode voltage $$EA1 = EA2$$

of the two valves V1 and V2. When the frequency is such that the crystal is in series-resonance, the voltage EG1 leads the voltages EA by approximately 90° whilst the voltage EG2 lags behind the voltages EA by the same amount, the grid voltages EG1 and EG2 being, of course, in phase opposition and the anode voltages being in phase. In these conditions currents IA1 and IA2 in resistors R1 and R2 are equal. At frequencies lower than that at which the crystal is in series-resonance, the phase of the voltage EG1 tends to become in phase with the voltages EA while the phase of the voltage EG2 tends to phase opposition with these voltages. The result of this is that the current passed by rectifier V2 decreases whilst that passed by rectifier V1 increases, that is current IA2 in resistor R2 is less than the current IA1 in resistor R1. At frequencies higher than that at which the crystal is in series-resonance, the phase of the voltage EG1 tends towards phase opposition with the voltages EA while the phase of the voltage EG2 tends to become in phase with these voltages. The result of this is that the current passed by rectifier V2 increases while that passed by rectifier V1 decreases, that is the current IA2 in resistor R2 is greater than the current IA1 in resistor R1.

In this circuit the condition resulting from parallel resonance of the crystal and its associated capacitances may be suppressed by suitable choice of the resistive values of resistors R7 and R8.

What I claim is:

1. A frequency discriminator including a pair of similar grid-controlled rectifiers having at least an anode, a control grid, a cathode, and a load resistor in the anode to cathode circuit, the said resistors being of equal resistivity; a source of radio-frequency wave energy whose frequency is to be stabilized or variations in the mean frequency or phase of which are to be detected; circuit means for applying wave energy of fixed relative phase relationship from said source to the anode to cathode circuit of said rectifiers; and circuit means including a piezo-electric crystal for applying wave energy of in-phase relationship from said source across the grid to cathode space of said rectifiers, the said crystal being resonant at the desired or mean frequency of said wave energy and being situated, that at the said desired or mean frequency a quadrature relationship exists between the phases of the wave energies applied respectively to the anodes and grids of said rectifiers so that equal currents are produced in said load resistors, and that at other frequencies the phase relationship between the wave energy applied respectively to the anodes and grids moves in one sense or the other, depending upon the sense of change in frequency, from phase-quadrature so that unequal currents are produced in said load resistors.

2. A discriminator as claimed in claim 1, wherein the said means for applying wave energy from said source across the grid to cathode space includes a capacitor, the junction point of the capacitor and piezo-electric crystals being connected to the grids of said valves and matters are so arranged that the piezo-electric crystal and capacitor are series resonant at the desired or mean frequency of said wave energy.

3. A frequency discriminator including a pair of similar triode valves each having an anode, a control grid, and a cathode; a tuned input circuit having its opposite ends connected respectively to the anodes of the two valves; a connection including a capacitor in series with a parallel-connected piezo-electric crystal and a resistor, from one end of said tuned input circuit to a point of reference potential the grids of both valves being connected in common to the junction of said capacitor and parallel connected crystal and resistor; a connection including a resistor shunted by a capacitor from the cathode of each valve to said point of reference potential; and a connection from said point of reference potential to the mid-point of said tuned input circuit; said piezo-electric crystal being resonant at the desired or mean frequency of wave energy in said tuned input circuit.

4. A discriminator as claimed in claim 3, including a differential capacitor having its stator plates connected respectively to opposite ends of said tuned input circuit and its rotor plates connected to the grids of the two valves.

5. A frequency discriminator including a pair of similar triode valves each having an anode, a control grid, and a cathode; a tuned input circuit comprising the secondary winding of a transformer having its opposite ends connected respectively to the anodes of the two valves; a connection including in series a capacitor, a re-resistor, and a parallel-connected piezo-electric crystal and a resistor from one end of the primary winding of said transformer to a point of reference potential, the grids of both valves being connected in common to the junction of the first mentioned resistor with the parallel-connected crystal and resistor; a connection including a resistor shunted by a capacitor from the cathode of each valve to said point of reference potential; and a connection from said point of reference potential to the mid-point of said tuned input circuit; said piezo-electric crystal being resonant at the desired or mean frequency of wave energy in said tuned input circuit.

6. A discriminator as claimed in claim 5, wherein the grids of said valves are connected through balancing capacitors to the anodes of said valves.

7. A frequency discriminator including a pair of similar triode valves each having an anode, a control grid, and a cathode; a tuned circuit having its opposite ends connected respectively to the anodes of the two valves; a connection including a piezo-electric crystal in series with a parallel-connected capacitor and resistor from one end of said tuned input circuit to a point of reference potential, the grids of both valves being connected in common to the junction of said piezo-electric crystal with said parallel-connected capacitors and resistor; a connection including a resistor shunted by a capacitor from the cathode of each valve to said point of reference potential; and a connection from said point of reference potential to the mid-point of said tuned input circuit; said piezo-electric crystal being resonant at the desired or mean frequency of wave energy in said tuned input circuit.

8. A discriminator as claimed in claim 7 including an adjustable capacitor between the other end of said tuned input circuit and said grids serving to neutralize the capacitance of the crystal holder.

HERBERT REGINALD CANTELO.